United States Patent Office 3,183,196
Patented May 11, 1965

3,183,196
SILICA-VANADIUM OXIDE OXIDATION CATALYST
Masami Watanabe, Suginami-ku, Tokyo, and Kiyoshi Shirai, Kokura, Japan, assignors to Yawata Chemical Industry Co., Ltd., Tokyo, Japan
No Drawing. Filed May 11, 1962, Ser. No. 194,157
Claims priority, application Japan, Feb. 21, 1962, 37/6,766
6 Claims. (Cl. 252—456)

This invention relates to a catalyst for gas phase oxidation of hydrocarbons.

The catalyst according to the present invention has an excellent catalytic action in producing, for example, phthalic anhydride by gas phase oxidizing naphthalene or othoxylene, maleic anhydride by gas phase oxidizing benzene, and anthraquinone by gas phase oxidizing anthracene.

Generally, in a method of producing phthalic anhydide by gas phase oxidation it is considered that, for example, when napthalene is gas phase oxidized with a gas containing oxygen at a high reaction temperature of 400 to 450° C., the naphthalene will completely burn through naphthoquinone, phthalic anhydride and maleic anhydride and will form carbon dioxide and water or in case orthoxylene as a raw material is gas phase oxidized with a gas containing oxygen at a high reaction temperature, such as 450 to 480° C., the orthoxylene will completely burn through phthalic anhydride and maelic anhydride and form carbon dioxide and water. Further, such oxidizing reactions will be accompanied with the formation of a great amount of heat. Therefore, the use of various catalysts for producing phthalic anhydride by gas phase oxidizing naphthalene has been investigated. One such oxidizing catalyst is vanadium pentoxide in a carrier such as pumice alumina or silica gel. Another catalyst considered to be particularly excellent is a mixed catalyst of vanadium oxide and potassium sulphate contained in silica gel which is used for the production of phthalic anhydride. The oxidizing conditions are a reaction temperature of 370 to 400° C., a space velocity SV (air l./hr. and catalyst l.) of 1000 and a mixing rate of 36 to 38 gr./m.$^3$. The yield of crude phthalic anhydride is 103%. STY (product gr./hr. and catalyst l.) is 37.2. It is considered to be an excellent catalyst. However, the defect of this catalyst is that its space velocity SV is low which reduces its industrial value.

Further, in producing maelic anhydride by the gas phase oxidation of benzene with air at a high reaction temperature of 450 to 520° C., the benzene will completely burn through benzoquinone and maleic anhydride and will form carbon dioxide and water. Further, such an oxidizing reaction is accompanied with a remarkable formation of heat. Therefore, the use of various catalysts for producing maleic anhydride by gas phase oxidizing benzene has been investigated. One such oxidizing catalyst is vanadium pentoxide in a carrier such as pumice, alumina or corundum. Another catalyst considered to be especially excellent is a mixed catalyst of vanadium oxide and molybdenum oxide carried in alumina which is used for the production of maelic anhydride. The oxidizing conditions are a reaction temperature of 470 to 490° C., a space velocity SV of 3000 to 5000 and a mixing rate of 30 to 35 gr./m.$^3$. The yield of maelic anhydride is about 75%. However, the defects of this catalyst is that its yield is low and that its catalytic life is short, i.e. about six months, which reduces its industrial value.

Further, in producing anthraquinone by the gas phase oxidation of anthracene with air at a high reaction temperature of 390 to 450° C., the anthracene will completely burn through anthraquinone, phthalic anhydride and maleic anhydride and will form carbon dioxide and water. Further, such oxidizing reaction will be accompanied with the formation of a great amount of heat. Therefore, the use of various catalysts for producing anthraquinone by gas phase oxidizing anthracene has been investigated. One such oxidizing catalyst is vanadium pentoxide carried on a carrier such as pumice or alumina. One catalyst considered to be especially excellent is a mixed catalyst of vandaum pentoxide, potassium sulphate and iron oxide as carried in pumice which is used for the production of anthraquinone. The oxidizing conditions are a reaction temperature of 380 to 395° C., a space velocity SV of 1,500 and a mixing rate of 21 g./m.$^3$. The yield of anthraquinone is about 95 to 97%. However, the defects of this catalyst is that its yield and STY are low and that the purity of the raw material must be at least 97% which reduces its industrial value.

Further, each of the above mentioned catalysts have a high breaking rate and, therefore are not tough catalysts. The breaking rate, as defined herein is a percentage of breaks of test samples of a molded catalyst when the impact test is carried out by erecting a glass tube 25 cm. long and 12 mm. in diameter which contains the sample and dropping a metal weight of 5 g. from a height of 25 cm.

As a result of various researches with a view to overcoming such conventional defects as are mentioned above, we have invented a highly active and strong catalyst for oxidation.

That is to say, the present invention relates to a catalyst for oxidation characterized in that silicon oxide as a raw material is hydrated as it is to first produce a hydrate ($SiO_2 \cdot nH_2O$ wherein $n$ is 1 or 2), a vanadium compound is then added to said hydrate to obtain a pasty mixture, any other carrier and/or catalyst ingredients are then added as required to said pasty mixture and the mixture is fired above the decomposing temperature of the vanadium compound (at which temperature the compound is transformed into vanadium oxide). Further, the present invention relates to an activated catalyst for oxidation characterized in that silicon oxide as a raw material is hydrated as it is to first produce a hydrate ($SiO_2 \cdot nH_2O$ wherein $n$ is 1 or 2) a vanadium compound is then added to said hydrate or silicon oxide is hydrated while adding the vanadium compound in order to obtain a pasty mixture, any other carrier and/or catalyst ingredients are added as required to said pasty mixture and the mixture is fired above the decomposing temperature of the vanadium compound (at which temperature the compound is transformed into vanadium oxide) and further, in order to increase the catalytic activity, any escaping ingredient, if any, in the fired mixture is supplemented as required, silicon oxide in said mixture is hydrated to make the mixture pasty and the pasty mixture is then molded and fired and, in some cases, it is further repeatedly hydrated, molded and fired.

The silicon oxide used in the present invention can be silicon oxide, per se, or silicon oxide carried on, for example, a powdered carrier, natural carrier or molded carrier. The vanadium compound which may be used is a compound which will produce vanadium oxide when fired as, for example, vanadium pentoxide or ammonium metavanadate.

If, in order to increase the catalytic activity, the fired product is further hydrated or, if it is repeatedly hydrated, molded and fired, the production of the hydrate in the present invention should be carried out, for example, in a heated and pressed state by adding water to the powder of the catalyst so that the silicon oxide is hydrated. In such a case, if an inorganic or organic acid is used, such as a hydration accelerator, the hydration will be accelerated and can be even carried out at normal pressure. The inorganic acid is, for example, sulphuric acid, hydrochloric acid or phosphoric acid. The organic acid is a low carbon fatty acid such as, for example, oxalic acid, maleic acid or succinic acid.

The carrier ingredient of the present invention, in addition to the essential silicon oxide can be a metal oxide as, for example, magnesium oxide, aluminum oxide or titanium oxide; an inorganic compound as, for example, a sulphate, phosphate or carbide, or a natural product such as, for example, diatomaceous earth, Japanese acid clay, pumice or refractory hyalite. The catalyst ingredients are a vanadium compound (the main catalyst) and an assistant catalyst such as a compound of potassium, calcium, titanium, chromium, manganese, iron, cobalt, nickel, copper, zinc, molybdenum, palladium, silver, cadmium, cerium or platinum or an inorganic salt such as a sulphate or phosphate which are added as an effective ingredient depending on the use of the catalyst.

In the present invention, the catalyst ingredients, i.e., a vanadium compound and any other catalyst, can be mixed in the form of an aqueous solution or in the form of the compound as it is into a hydrate. Therefore, in the present invention, the total amount of the catalyst ingredients can be freely mixed and the obtained catalyst has the ingredients uniformly distributed and adsorbed.

The catalyst obtained according to the present invention not only has an effective activity but also is tough and gives a high yield and purity of the oxidation product. Further, it is to be specifically noted that in the present invention, when the fired product is further hydrated to be made pasty as mentioned above, and is then molded and fired and then in some instances further hydrated, molded and fired, a so-called activated catalyst having a more effective activity will be obtained. The thus obtained catalyst according to the present invention not only has an effective activity and is tough but also gives a higher yield and the purity of the oxidation product than any catalyst not activated as described above. It is to be particularly noted that the life of the catalyst is long and the STY is very high in the present invention. Thus the catalyst of the present invention is an industrially superior catalyst.

Further, the present invention can be utilized to produce a tough carrier by producing a hydrate ($SiO_2 \cdot nH_2O$) wherein $n$ is 1 to 2 by hydrating silicon oxide ($SiO_2$) and using the hydrate, per se, or by mixing some other carrier ingredient into the hydrate.

The following examples will explain the present invention with even more particularity.

*Example 1*

1.4 cc. of an aqueous solution of 5% succinic acid and 18 cc. of water were added to 20 g. of a powder of silicon oxide. The mixture was hydrated for 2 hours, while being well kneaded, at 2 kg./cm.$^2$ and 120° C. in a jacketed mixer. To this hydrate were added 20 g. of magnesium oxide, 60 g. of titanium oxide and 89 cc. of water. The mixture was mixed for 2 hours in a mixer so as to produce a paste. The pasty mixture was molded into molds 5 mm. in diameter and 5 mm. long. When the molds were dried at 60° C. for 6 hours and were fired at about 360° C. for 10 hours, a tough carrier of an apparent specific gravity of 0.590 and a breaking rate of 5% was obtained.

The breaking rate of a carrier produced in the same manner as exemplified above but using silicon oxide, per se, instead of hydrated silicon oxide was 100%.

Further, a low carbon organic acid such as oxalic acid or maleic acid could be used instead of succinic acid as a hydration accelerator.

*Example 2*

1.0 cc. of an aqueous solution of 16% maleic acid and 18 cc. of water were added to 20 g. of a powder of silicon oxide. The mixture was hydrated as in Example 1 so as to produce a hydrate. On the other hand, as catalyst ingredients, 20 g. of oxalic acid and 200 cc. of water were added to 10 g. of vanadium pentoxide. The mixture was heated at about 80° C. for 16 hours so as to reduce and dissolve the vanadium pentoxide. The solution was then concentrated to prepare 90 cc. of a vanadyl oxalate solution. To this solution was added the above mentioned hydrate, 20 g. of magnesium and 60 g. of a powder (passing through 300 meshes per inch) of alundum. The mixture was molded into molds 5 mm. in diameter and 5 mm. long. When the molds were dried at 60° C. for 6 hours and were fired at about 340° C. for 10 hours, a tough catalyst of an apparent specific gravity of 0.61 and a breaking rate of 25% was obtained.

The breaking rate of a catalyst produced in the same manner as above but using silicon oxide, per se, instead of using hydrated silicon oxide, was 100%.

*Example 3*

0.4 cc. of a solution of 85% phosphoric acid and 24 cc. of water were added to 60 g. of a powder of silicon oxide. The mixture was hydrated for 3 hours while being well kneaded at 60° C. in a jacketed mixer. To this hydrate were added 35 g. of ammonium sulphate, 5 g. of ammonium phosphate and 12 cc. of water. The mixture was mixed for 2 hours in a mixer to produce a paste. On the other hand, 4.58 g. (0.025 mol) of vanadium pentoxide were suspended in 30 cc. of a solution of 16% sulphuric acid. Sulphur dioxide was blown into the suspension to prepare a solution of a vanadyl sulphuric acid solution. To this were added 4.5 g. (0.026 mol) of potassium sulphate to prepare a mixed sulphuric acid solution. With this mixed sulphuric acid solution was mixed the above mentioned hydrate of silicon oxide to form a paste. The pasty mixture was molded into tablets 5 mm. in diameter and 5 mm. long. The tablets were dried at 60° C. for 10 hours and then fired at 350° C. for 12 hours. 1 liter of catalyst thus produced was put into a reaction tube dipped in a melted salt bath. When a mixed gas at a rate of 40 g. of crude naphthalene (of a purity of about 96%) per m.$^3$ of air was gas phase oxidized at a space velocity SV of 1,200 for 3 hours in the catalyst layer at a temperature of 350° C. of the bath salt, crude phthalic anhydride of a purity of 97% was obtained at a yield of 105.2% (STY 48.9).

When a catalyst was produced by using a powder of silicon oxide, per se, instead of hydrated silicon oxide and in otherwise the same manner as is mentioned above, the breaking rate of the catalyst was 65%. When the gas phase oxidation was done in the same manner as is mentioned above by using this catalyst, crude phthalic anhydride of a purity of 89% was obtained at a yield of 92%.

*Example 4*

5.35 g. of vanadium pentoxide were suspended in 33 cc. of a solution of 16% sulphuric acid. While the suspension was being warmed to 60 to 70° C., 3 liters of sulphur dioxide were blown into it to prepare a vanadyl sulphuric acid solution. To this solution were added 50 g. of silica gel, 25 g. of potassium sulphate, 25 g. of ammonium sulphate and 0.5 g. of potassium phosphate. The mixture was well mixed. 20 cc. of water were added to the mixture. The mixture was kneaded to form a paste and was made into tablets 5 mm. in diameter and 5 mm. long. The tablets were dried and were fired at 360° C. for 12 hours so that the vanadyl sulphate might be made vanadium oxide. The thus obtained tablets themselves had a catalytic activity. However, according to the present invention, in order to specifically activate this catalyst, the tablets were crushed to 100 meshes per inch, 5 g. of silica gel and 10 g. ammonium sulphate were added to 100 g. of the crushed catalyst to supplement the ingredients which escaped during the above mentioned firing. The mixture was well mixed, 15 cc. and 55 cc. of a solution of 16% sulphuric acid were added to the mixture, the mixture was kneaded to hydrate the silicon oxide of the carrier ingredient and form a paste. The paste was made into tablets 5 mm. in diameter and 5 mm. long and the tablets were dried and were then fired at 360° C. for 12 hours to obtain an activated catalyst.

1 liter of this activated catalyst was put into a reaction tube dipped in a molten salt bath. When a mixed gas at a rate of 40.6 g. of crude naphthalene (of a purity of about 96%) per m.³ of air was gas phase oxidized at a space velocity SV of 1,960 in the catalyst layer at a temperature of 365° C. of the bath salt, crude phthalic anhydride of a purity of 97.4% was obtained at a yield of 103.2% (STY 80.0).

When 1 liter of the aforementioned catalyst that was not activated was put into a reaction tube, dipped in a melted salt bath and a mixed gas at a rate of 36.6 g. of crude naphthalene (of a purity of 96%) per m.³ of air was gas phase oxidized at a space velocity SV of 1,000 in the catalyst layer at a temperature of 365° C. of the bath salt, crude phthalic anhydride of a purity of 95.4% was obtained at a yield of 101% (STY 35.4).

*Example 5*

6.88 g. of ammonium metavanadate, 50 g. of silica gel, 25 g. of potassium sulphate, 25 g. of ammonium sulphate and 0.5 g. of phosphoric acid were added together and were mixed very well. To this mixture were added 33 cc. of a solution of 16% sulphuric acid and 20 cc. of water. The mixture was well kneaded to form a paste. The pasty mixture was made into tablets 5 mm. in diameter and 5 mm. long. The tablets were dried and were then fired at 360° C. for 24 hours so that ammonium metavanadate decomposed to vanadium oxide. The tablets themselves had a catalytic activity. However, according to the present invention, in order to specifically activate this catalyst, the tablets were crushed to 100 meshes per inch, 0.62 g. of ammonium metavanadate, 5 g. of silica gel and 12 g. of ammonium sulphate were well mixed with 100 g. of the crushed catalyst to supplement the ingredients that escaped during the above mentioned firing, 70 cc. of water were added to the mixture, the mixture was well kneaded at a temperature of 155° C. and a pressure of 5 kg./cm.² for 10 hours to hydrate the silicon oxide of the carrier ingredient, to form a paste. The paste was made into tablets 5 mm. in diameter and 5 mm. long and the tablets were dried and were then fired at 360° C. for 12 hours to obtain an activated catalyst.

When 1 liter of this activated catalyst was put into a reaction tube dipped in a melted salt bath and a mixed gas at a rate of 41.4 g. of crude naphthalene (of a purity of about 96%) per m.³ of air was gas phase oxidized at a space velocity SV of 2,020 in the catalyst layer at a temperature of 365° C. of the bath salt, crude phthalic anhydride of a purity of 96.2% was obtained at a yield of 101.8% (STY 81.9).

When 1 liter of the aforementioned catalyst that was not activated was put into a reaction tube dipped in a melted salt bath and a mixed gas at a rate of 36.2 g. of crude naphthalene (of a purity of 96%) per m.³ of air was gas phase oxidized at a space velocity SV of 1,000 in the catalyst layer at a temperature of 365° C. of the bath salt, crude phthalic anhydride of a purity of 94.6% was obtained at a yield of 99.6% (STY 34.1).

*Example 6*

22.0 g. of vanadium pentoxide were suspended in 40 cc. of a solution of 16% sulphuric acid. While the suspension was being warmed to 60 to 70° C., 13 liters of sulphur dioxide were blown into it to prepare a vanadyl sulphuric acid solution. To this solution were added 10 g. of silica gel, 0.60 g. of potassium sulphate aind 114 g. of alumina. The mixture was very well mixed. 50 cc. of water were added to the mixture. The mixture was once warmed to 60° C. and was then well kneaded to form a paste and left to cool. The pasty mixture was made into tablets 4 mm. in diameter and 4 mm. long.

The tablets were dried and were then fired at 355° C. for 12 hours so that vanadyl sulphate might be made vanadium oxide. The tablets themselves had a catalytic activity. However, according to the present invention, in order to specifically activate this catalyst, the tablets were crushed to 200 meshes per inch, 40 cc. of a solution of 16% sulphuric acid and 50 cc. of water were added to 100 g. of the crushed catalyst. The mixture was warmed to 60° C., was then well kneaded while being left to cool so as to hydrate the silicon oxide of the carrier ingredient and form a paste. The paste was made into tablets 4 mm. in diameter and 4 mm. long and the tablets were dried and were then fired at 355° C. for 12 hours to obtain an activated catalyst.

When 1 liter of this activated catalyst was put into a reaction tube dipped in a melted salt bath and a mixed gas at a rate of 41.6 g. of orthoxylene per m.³ of air was gas phase oxidized at a space velocity SV of 2,500 in the catalyst layer at a temperature of 410° C. of the bath salt, crude phthalic anhydride of a purity of 96.2% (containing 2.2% maleic anhydride) was obtained at a yield of 98.4% (STY 98.4).

When 1 liter of the aforementioned catalyst that was not activated was put into a reaction tube dipped in a melted salt bath and a mixed gas at a rate of 32.4 g. of orthoxylene per m.³ of air was gas phase oxidized at a space velocity SV of 1,540 in the catalyst layer at a temperature of 410° C. the bath salt, crude phthalic anhydride of a purity of about 94.2% (containing 4.2% maleic anhydride) was obtained at a yield of 89.6% (STY 42.1).

*Example 7*

7.5 g. of vanadium pentoxide were warmed and were dissolved in 75 cc. of a solution of 26.4% oxalic acid to prepare a vanadyl oxalic acid solution. On the other hand, 3.5 g. of ammonium phosphomolybdate were warmed and were dissolved in 75 cc. of a solution of 25.2% oxalic acid to prepare an oxalic acid solution of ammonium phosphomolybdate. This solution and the above mentioned vanadyl oxalic solution were mixed together. To this mixed solution were added 5 g. of silica gel and 120 g. of alumina. The mixture was very well mixed and was well kneaded at 60° C. to form a paste. The pasty mixture was made into tablets 5 mm. in diameter and 5 mm. long. The tablets were dried and were then fired at 400° C. for 10 hours so that vanadyl oxalic acid might be made vanadium oxide. The tablets themselves had a catalytic activity. However, according to the present invention, in order to specifically activate this catalyst, the tablets were crushed to 200 meshes per inch, 100 cc. of a solution of 5% oxalic acid were added to 100 g. of the crushed catalyst, the mixture was well kneaded at 60° C. to hydrate the silicon oxide of the carrier ingredient and form a paste. This paste was made into tablets 5 mm. in diameter and 5 mm. long and the tablets were dried and then fired at 400° C. for 10 hours to obtain an activated catalyst.

When 1 liter of this activated catalyst was put into a reaction tube dipped in a melted salt bath and a mixed gas at a rate of 32.4 g. of benzene per m.³ of air was gas phase oxidized at a space velocity SV of 3,200 in the catalyst layer at a temperature of 450° C. of the bath salt, maleic anhydride was obtained at a yield of 89.6% (STY 92.9).

When 1 liter of the aforementioned catalyst that was not activated was put into a reaction tube dipped in a melted salt bath and a mixed gas at a rate of 28.0 g. of benzene per m.³ of air was gas phase oxidized at a space velocity SV of 2,700 in the catalyst layer at a temperature of 450° C. of the bath salt, maleic anhydride was obtained at a yield of 82.4% (STY 62.3).

*Example 8*

10.5 g. of vanadium pentoxide were suspended in 20 cc. of a solution of 16% sulphuric acid. 6 liters of sulphur dioxide were blown into the suspension while it was being warmed to 60 to 70° C. to prepare a vanadyl sulphuric acid solution or a solution A. 0.282 g. of ferric chloride was dissolved in 10 cc. of water to prepare a solution B. Further, 0.70 g. of potassium sulphate was dissolved in 10 cc. of water to prepare a solution C. To the mixture of solutions A, B and C were added 10 g. of silica gel and 114 g. of alumina. The mixture was very well mixed. 30 cc. of water were further added to the mixture. The mixture was once heated to 60° C., was then well kneaded while being left to cool and made into tablets 4 mm. in diameter and 4 mm. long. The tablets were dried and were then fired at 330° C. for 12 hours so that vanadyl sulphate might be made vanadium oxide. The tablets themselves had a catalytic activity. However, according to the present invention, in order to specifically activate this catalyst, the tablets were crushed to 200 meshes per inch, 50 cc. of a solution of .5% hydrochloric acid and 20 cc. of water were added to 100 g. of the crushed catalyst, the mixture was warmed to 60° C., was then left to cool and was well kneaded to hydrate the silicon oxide of the carrier ingredient and form a paste. The paste was made into tablets 4 mm. in diameter and 4 mm. long and the tablets were dried and were then fired at 330° C. for 2 hours to obtain an activated catalyst.

When 1 liter of this activated catalyst was put into a reaction tube dipped in a melted salt bath and a mixed gas at a rate of 31.6 g. of crude anthracene (of a purity of about 92.0%) per m.$^3$ of air was gas phase oxidized at a space velocity SV of 3,200 in the catalyst layer at a temperature of 395° C. of the bath salt, crude anthraquinone of a purity of 94.6% (containing 4.2% phthalic anhydride, 0.2% maleic anhydride and a trace of an unreacted substance) was obtained at a yield of 98.6% (STY 94.3).

When 1 liter of the aforementioned catalyst that was not activated was put into a reaction tube dipped in a melted salt bath and a mixed gas at a rate of 26.0 g. of anthracene (of a purity of about 98%) per m.$^3$ of air was gas phase oxidized at a space velocity SV of 2,200 in the catalyst layer at a temperature of 395° C. of the bath salt, crude anthraquinone of a purity of 90.4% (containing 7.2% phthalic anhydride, 0.6% maleic anhydride and 1.2% unreacted substance) was obtained at a yield of 94.2% (STY 48.7).

What we claim is:
1. A process for producing a highly active oxidation catalyst which comprises hydrating solid $SiO_2$ at a temperature of between 120° to 250° C. and at a pressure of between 2 kg./cm.$^2$ to 200 kg./cm.$^2$, thereby producing $SiO_2.nH_2O$ wherein $n$ is a positive integer from 1 to 2, intimately admixing said $SiO_2.nH_2O$ and a vanadium compound selected from the group consisting of vanadium pentoxide and ammonium metavanadate thereby obtaining a pasty mixture, molding said pasty mixture to tablets, and firing the thus obtained tablets at a temperature, below 400° C., sufficient to decompose said vanadium compound to vanadium oxide.

2. A process for producing a highly active oxidation catalyst which comprises hydrating solid $SiO_2$ at a temperature of between 60° to 250° C. and between ambient pressure and a pressure of 200 kg./cm.$^2$ in the presence of a hydration accelerator, thereby producing $SiO_2.nH_2O$ wherein $n$ is a positive integer from 1 to 2, intimately admixing said $SiO_2.nH_2O$ with a vanadium compound selected from the group consisting of vanadium pentoxide and ammonium metavanadate, thereby obtaining a pasty mixture, molding said pasty mixture to tablets and firing the thus obtained tablets at a temperature, below 400° C., sufficient to decompose said vanadium compound to vanadium oxide.

3. A process according to claim 2 wherein the hydration accelerator is selected from the group consisting of sulfuric acid, hydrochloric acid and phosphoric acid.

4. A process according to claim 2 wherein the hydration accelerator is selected from the group consisting of oxalic acid, maleic acid and succinic acid.

5. A process for producing a highly active oxidation catalyst which comprises adding a vanadium compound selected from the group consisting of vanadium pentoxide and ammonium metavanadate to $SiO_2$ while hydrating said $SiO_2$ at a temperature of between 120° and 250° C. and at a pressure of between 2 kg./cm.$^2$ and 200 kg./cm.$^2$, thereby forming a pasty mixture, molding said pasty mixture to tablets, firing the thus obtained tablets at a temperature, below 400° C., sufficient to decompose said vanadium compound to vanadium oxide.

6. A highly active oxidation catalyst produced by hydrating solid $SiO_2$ to produce $SiO_2.nH_2O$ wherein $n$ is a positive integer from 1 to 2, intimately admixing said $SiO_2.nH_2O$ and a vanadium compound selected from the group consisting of vanadium pentoxide and ammonium metavanadate thereby obtaining a pasty mixture, molding said pasty mixture to tablets, and firing the thus obtained tablets at a temperature, below 400° C., sufficient to decompose said vanadium compound to vanadium oxide.

References Cited by the Examiner
UNITED STATES PATENTS

| | | | |
|---|---|---|---|
| 2,027,316 | 1/36 | Johnson | 252—456 X |
| 2,471,853 | 5/49 | Beach et al. | 252—456 X |
| 2,504,001 | 4/50 | Connolly | 252—456 X |

MAURICE A. BRINDISI, *Primary Examiner.*